United States Patent [19]
McFarland et al.

[11] 3,863,842
[45] Feb. 4, 1975

[54] FERTILIZER APPLICATOR

[76] Inventors: Raymond J. McFarland, Box 36; David L. McFarland, Box 54, both of Gwinner, N. Dak. 58044

[22] Filed: Apr. 11, 1974

[21] Appl. No.: 460,117

[52] U.S. Cl. ............... 239/283, 239/598, 239/601, 111/7
[51] Int. Cl. ............................ B05b 1/06
[58] Field of Search ....... 239/283, 598, 601; 47/1.7; 111/6, 7, 7.4

[56] References Cited
UNITED STATES PATENTS

| | | | |
|---|---|---|---|
| 1,968,978 | 8/1934 | White | 239/601 X |
| 2,874,656 | 2/1959 | Bennett | 111/7 |
| 3,143,984 | 8/1964 | Morasch | 47/1.7 X |
| 3,326,152 | 6/1967 | Frantzen | 111/7 |
| 3,745,944 | 7/1973 | Yetter et al. | 111/7 |

*Primary Examiner*—M. Henson Wood, Jr.
*Assistant Examiner*—John J. Love
*Attorney, Agent, or Firm*—Dorsey, Marquart, Windhorst, West & Halladay

[57] ABSTRACT

A fertilizer applicator for mounting on a cultivator or similar earthworking tool. The applicator is particularly suited for dispensing gaseous fertilizers, most typically, anhydrous ammonia, and has features that eliminate plugging and increase durability.

5 Claims, 7 Drawing Figures

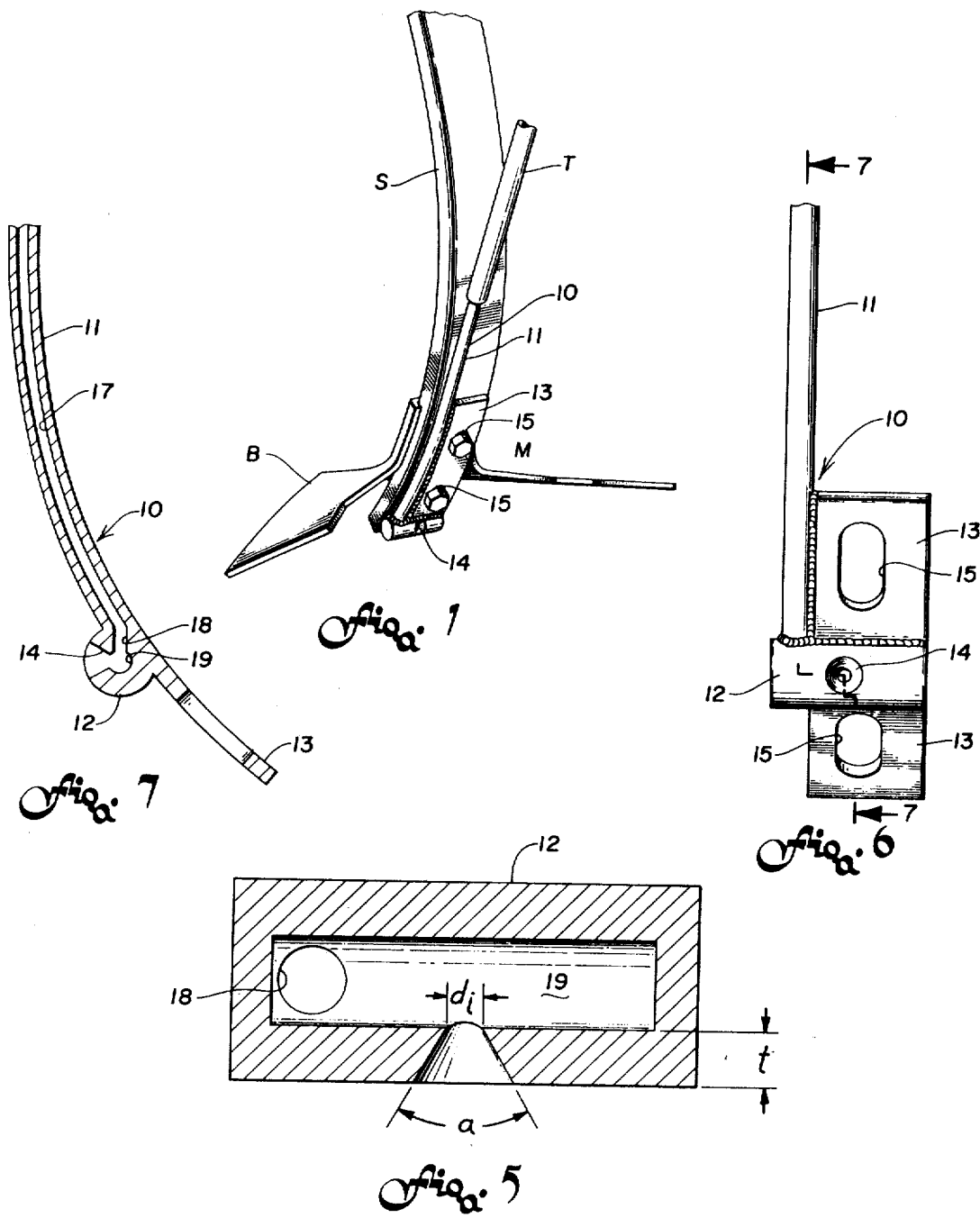

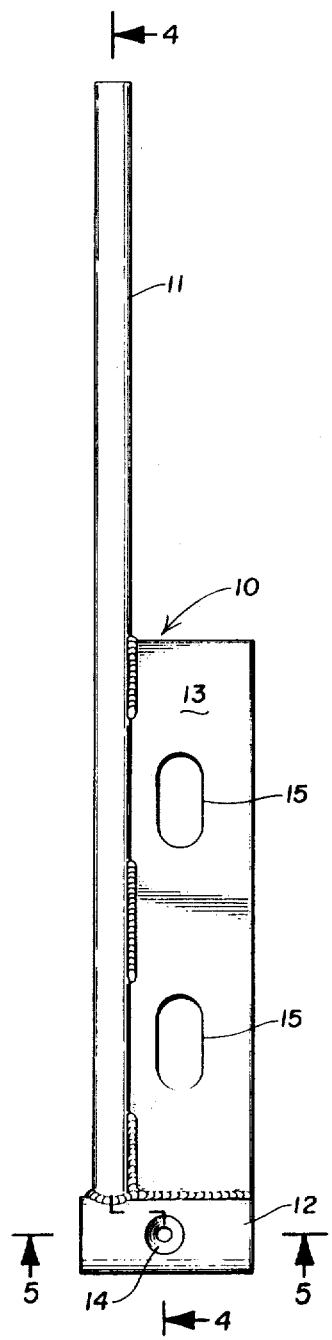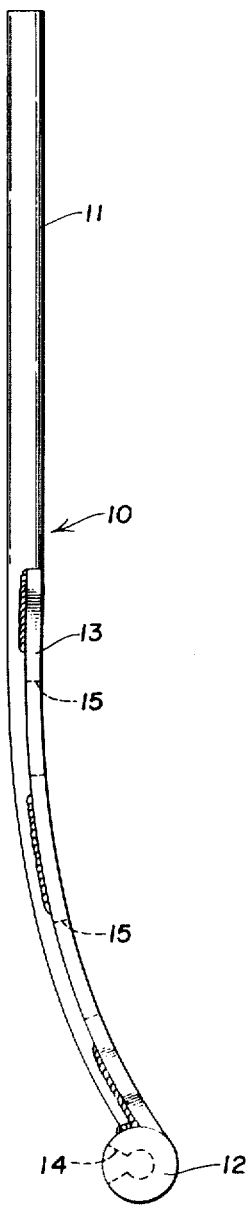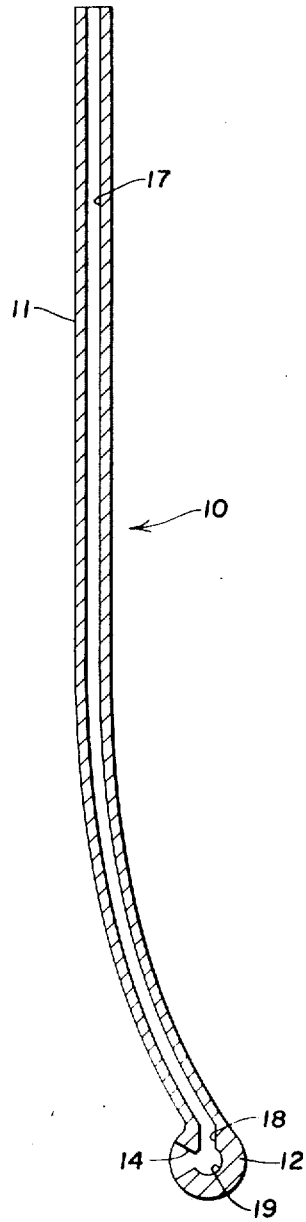

FERTILIZER APPLICATOR

BACKGROUND OF THE INVENTION

The invention resides in the field of liquid-gaseous fertilizer application in association with cultivation or other earthworking activity. The advent of chemical fertilizers, particularly those in liquid-gaseous form, has led to the field of fertilizer application to which the present invention applies. In this field the fertilizer, most typically anhydrous ammonia, is provided in a tank in liquid form with a substantial vapor pressure due to vaporization of a portion of the liquid in the tank. Upon release or dispensing of the chemical in gaseous form a substantial pressure drop occurs in the vicinity of the nozzle and the temperature of the gas likewise drops substantially. The temperature drop, to a level well below the freezing point of water, coupled with the tendency of the chemical fertilizer to attract moisture, generally causes plugging problems in the nozzle. The moisture in the ground tends to freeze, binding dirt particles in the process to form a plug in the nozzle. The present invention relates to this field.

Another problem with prior art devices is that they lack the strength and rigidity to withstand repeated dragging through the ground and often become bent and broken due to rocks and other objects in the soil.

SUMMARY OF THE INVENTION

The invention includes a tubular elongated stem leading to a tubular transversely extending manifold which communicates with the stem passage. The transversely extending manifold is provided with a countersunk apperture extending through the tubular wall from the manifold passage to the exterior thereof. The included angle of the countersink is in the range of 60°–90° with the small diameter on the inside of the wall and the large diameter on the outside. The wall thickness of the manifold is in the range of one-sixteenth to three-sixteenths inch. The inner opening in the countersunk passage should be in the range of one-eighth to one-fourth inch. Means is provided for mounting the applicator to an implement shank. The mounting means consists of a plate continuously secured to both the tubular elongated stem and the transversely extending manifold.

A flexible tube leading from the fertilizer tank connects by a simple male-female relationship to the end of the tubular stem opposite the manifold.

Two embodiments of the invention are shown. They differ only with respect to location of the mounting plates.

BRIEF DESCRIPTION OF THE DRAWINGS

FIG. 1 is a perspective view of the rear of a cultivator shank and blade showing the first embodiment of the present invention mounted thereto, and showing a portion of the flexible tube leading from the elongated stem of the applicator to the liquid fertilizer tank (the latter not shown);

FIG. 2 is a rear view of the first embodiment of the fertilizer applicator;

FIG. 3 is a side view of the first embodiment;

FIG. 4 is a sectional view of the first embodiment taken on the section line 4—4 of FIG. 2;

FIG. 5 is a sectional view of the first embodiment taken on the section line 5—5 of FIG. 2;

FIG. 6 is a rear view of the second embodiment of the invention; and

FIG. 7 is a sectional view of the second embodiment taken on the section line 7—7 of FIG. 6.

DESCRIPTION OF THE PREFERRED EMBODIMENTS

The first embodiment of the present invention is shown in FIGS. 1–5 and can be generally understood with reference to FIG. 1. Fertilizer applicator 10 includes an elongated tubular stem 11, a tubular manifold 12 in communication with the tubular stem, and a mounting plate 13 mounted contiguously with the elongated stem 11 and the tubular manifold 12. Tubular manifold 12 defines countersunk aperture or nozzle 14.

Applicator 10 is mounted to the rear side of cultivator shank, S, which includes blade, B, by means of mounting bolts, M, which extend through mounting appertures 15. Flexible tube, T, connects with the liquid fertilizer tank (not shown) and is coupled to the free end of tubular member 11 in a simple male-female coupling.

With reference to FIGS. 4 and 5, elongated tubular member 11 is provided with a passage 17 extending the length thereof. Passage 17 communicates with cross bore 18 provided in the wall of tubular manifold 12, which in turn leads to passage 19. Countersunk aperture or nozzle 14 is provided in the wall of tubular manifold 12 on an axis approximately 90° from the axis of cross bore 18 to thereby provide a continuous passage from passage 17 in elongated tubular member 11, through cross bore 18, passage 19, and nozzle 14. This is best seen with reference to FIG. 4.

For optimum non-plugging characteristics the wall thickness, $t$, of tubular manifold 12 should be in the range of one-sixteenth to three-sixteenths inch. The inside diameter, $d^1$ should be in the range of one-eighth to one-fourth inch. The included angle of the countersink (alpha) should be in the range of 60°–90°.

Mounting bracket 13, shown in FIGS. 1–3, is welded to elongated tubular member 11 and transversely extending manifold 12 to provide rigidity. Mounting plate 13 defines two mounting apertures 15 which are in the form of slotted openings to provide for longitudinal adjustment of applicator 10 with respect to shank, S.

The second embodiment of the invention is shown in FIGS. 6 and 7. This embodiment is very similar to that of FIGS. 1–5, except a modified or additional mounting bracket is provided on the side of tubular manifold 12 opposite the point of attachment to elongated tubular member 11. In other respects the embodiment is the same as that of FIGS. 1–5. The modified design of FIGS. 6 and 7 locates nozzle 14 at a point higher up shank, S, thereby decreasing somewhat its exposure to rocks and other objects that could damage it.

In operation the applicator 10 is mounted on the rear of shank, S. One such applicator is mounted to each shank of the earthworking implement, most typically a cultivator (not shown). Flexible tube, T, is connected to the free or upper end of the elongated tubular member which connects with the liquid fertilizer tank (not shown) either mounted to or pulled by the cultivator.

Suitable valving is provided on the tank to control the dispensing of fertilizer and a pressure regulator is also provided to maintain the pressure at nozzle 14 in the range of 15–35 psi.

As the implement with fertilizer applicator 10 attached thereto passes through the ground and fertilizer such an anhydrous ammonia is dispensed through nozzle 14 of applicator 10, a marked cooling effect occurs. Temperatures at nozzle 14 are substantially below freezing. Moisture in the vicinity of nozzle 14 freezes and a plug tends to form. The critical wall thickness and countersink of nozzle 14 minimize the tendency to plug. Dirt and moisture in nozzle 14 will, of course, expand upon freezing. The expansion of the plug against the countersunk walls of nozzle 14 causes a resultant force in a direction substantially along the axis of nozzle 14 in an exterior direction. This force is augmented by the pressure in the passage 19 of tubular manifold 12. The result is that the plug is ejected.

Fertilizer applicator 10 also has substantial rigidity and strength to avoid bending and/or twisting when in use. The structural features of the applicator, namely, the transverse relationship between elongated tube 11 and manifold 12 and the location of mounting plate 13 in the quadrant between them, provides substantial rigidity.

I claim as my invention:

1. A fertilizer applicator comprising:

a tubular elongated stem having a longitudinal passage;

a tubular manifold extending transversely to the elongated stem, having a longitudinal passage therein in communication with the longitudinal passage of the elongated stem, and a countersunk aperture extending transversely through the tubular wall of the manifold from the passage therein to the exterior thereof;

a mounting plate secured to the elongated stem and the tubular manifold.

2. The fertilizer applicator of claim 1 wherein the inside diameter of the countersunk aperture is in the range of one-eighth to one-fourth inch.

3. The fertilizer applicator of claim 1 wherein the wall thickness of the tubular manifold is in the range of one-sixteenth to three-sixteenths inch.

4. The fertilizer applicator of claim 1 wherein the included angle of the countersunk aperture is in the range of 60°–90°.

5. The fertilizer applicator of claim 1 wherein the countersunk aperture extends in a direction transverse to the axis of the elongated stem and the axis of the tubular manifold.

* * * * *